(12) United States Patent
Balbach

(10) Patent No.: US 7,618,825 B2
(45) Date of Patent: Nov. 17, 2009

(54) METHOD FOR INFLUENCING AND MONITORING THE OXIDE LAYER ON METALLIC COMPONENTS OF HOT $CO_2/H_2O$ CYCLE SYSTEMS

(75) Inventor: Werner Balbach, Wuerenlingen (CH)

(73) Assignee: ALSTOM Technology Ltd., Baden (CH)

( * ) Notice: Subject to any disclaimer, the term of this patent is extended or adjusted under 35 U.S.C. 154(b) by 796 days.

(21) Appl. No.: 11/033,166

(22) Filed: Jan. 12, 2005

(65) Prior Publication Data

US 2005/0191755 A1 Sep. 1, 2005

Related U.S. Application Data

(63) Continuation of application No. PCT/IB03/03004, filed on Jul. 4, 2003.

(30) Foreign Application Priority Data

Jul. 12, 2002 (DE) .................. 102 31 879

(51) Int. Cl.
*G01N 21/72* (2006.01)
(52) U.S. Cl. .................. 436/155; 73/763; 324/693
(58) Field of Classification Search .................. 436/155; 73/763; 324/693; 702/136, 34
See application file for complete search history.

(56) References Cited

U.S. PATENT DOCUMENTS

| | | | |
|---|---|---|---|
| 5,987,876 A * | 11/1999 | Ziegner ........................ 60/776 |
| 6,282,880 B1 | 9/2001 | Wallace et al. |
| 6,537,465 B2 * | 3/2003 | Gottzmann et al. .......... 252/373 |
| 6,824,710 B2 * | 11/2004 | Viteri et al. .................. 252/373 |
| 6,885,006 B2 * | 4/2005 | Harrold et al. ............... 250/372 |
| 6,943,357 B2 * | 9/2005 | Srivastava et al. ......... 250/458.1 |
| 7,123,031 B2 * | 10/2006 | Twerdochlib ................ 324/693 |
| 7,243,042 B2 * | 7/2007 | Plotts et al. .................. 702/136 |
| 7,298,818 B2 * | 11/2007 | Subramanian et al. ........ 378/58 |
| 7,360,437 B2 * | 4/2008 | Hardwicke et al. ............. 73/763 |

FOREIGN PATENT DOCUMENTS

| | | |
|---|---|---|
| CH | 679460 | 2/1992 |
| DE | 2819917 | 11/1978 |
| DE | 4126811 | 2/1993 |

(Continued)

OTHER PUBLICATIONS

Search Report for German Patent Appl. No. 10231879.4 (Jul. 12, 2002).

(Continued)

*Primary Examiner*—N. Bhat
(74) *Attorney, Agent, or Firm*—Cermak Kenealy Vaidya & Nakajima LLP; Adam J. Cermak

(57) ABSTRACT

A method for influencing and monitoring the oxide layer on metallic components of hot $CO_2/H_2O$ cycle systems, in particular of $CO_2/H_2O$ gas turbine installations, in which a hydrocarbon-containing fuel is burnt with oxygen, and the excess $CO_2$ and $H_2O$ formed is removed from the cycle system at a suitable location. To protect the oxide layer of the components which are under thermal load, an excess of oxygen is used, the level of which is dependent on the current state of the oxide layer, the state of the oxide layer being determined by periodic and/or continuous measurements.

15 Claims, 4 Drawing Sheets

FOREIGN PATENT DOCUMENTS

| | | |
|---|---|---|
| DE | 19732268 | 1/1999 |
| DE | 10064270 | 7/2002 |
| EP | 0735241 | 10/1996 |
| EP | 1197258 | 4/2002 |
| EP | 1241473 | 9/2002 |
| JP | 11-148931 * | 2/1999 |
| WO | 2004/007927 | 1/2004 |

OTHER PUBLICATIONS

International Search Report for PCT Appl. No. PCT/IB03/03004 (Mar. 23, 2004).

International Preliminary Examination Report for PCT Appl. No. PCT/IB03/03004 (Jul. 14, 2004).

* cited by examiner

METHOD FOR INFLUENCING AND MONITORING THE OXIDE LAYER ON METALLIC COMPONENTS OF HOT $CO_2/H_2O$ CYCLE SYSTEMS This application is a Continuation of, and claims priority under 35 U.S.C. § 120 to, International application number PCT/IB03/03004, filed 4 Jul. 2003, and claims priority under 35 U.S.C. § 119 to German application number 102 31 879.4, filed 12 Jul. 2002, the entireties of both of which are incorporated by reference herein.

BACKGROUND OF THE INVENTION

1. Field of the Invention

The invention relates to a method for influencing and monitoring the oxide layer on metallic components of hot $CO_2/H_2O$ cycle systems, in particular of $CO_2/H_2O$ gas turbines.

2. Brief Description of the Related Art $CO_2/H_2O$ gas turbine systems having a largely closed $CO_2$ gas turbine cycle are known. A gas turbine system of this type comprises at least one compressor, at least one combustion chamber, at least one turbine, at least one heat sink and a water separator. In the combustion chamber, the fuel (hydrocarbon, e.g. natural gas with methane $CH_4$ as its main component) reacts with the oxygen of the atmosphere prepared from $O_2$, $CO_2$ and if appropriate $H_2O$.

The components $CO_2$ and $H_2O$ formed as a result of the combustion, as well as any inert gases introduced with the oxygen or the natural gas, are removed on an ongoing basis, so that a cycle with a substantially constant composition of the working medium is maintained.

Unlike in conventional gas turbine systems, in which the exhaust gases still contain a high level of $O_2$, the working medium in a cycle process of this type, predominantly comprising $CO_2$ and $H_2O$, may have reducing properties. Consequently, at the high temperatures which usually prevail in the combustion chamber and in the turbine, the protective oxide layer on the metal surfaces of the components that are subject to thermal load may disadvantageously be worn away. These components are then corroded quickly and can lead to undesirable premature failure.

SUMMARY OF THE INVENTION

It is an aspect of the invention to avoid the abovementioned drawbacks of the prior art. One aspect of the present invention includes developing a method for influencing and monitoring the oxide layer on components of hot $CO_2/H_2O$ cycle systems, in particular of $CO_2/H_2O$ gas turbines. The method is to be as simple as possible to implement.

According to principles of the present invention, an exemplary method in accordance therewith, to protect the oxide layer of the components which are under thermal load, an excess of oxygen is used, the level of which is dependent on the current state of the oxide layer, this state of the oxide layer being determined by periodic and/or continuous measurements.

Advantages of the invention include that with the method according to the present invention it is possible to prevent undesirable removal of the protective oxide layer on the surfaces of the metallic components that are subject to thermal load, and therefore to counteract corrosive damage and premature failure of the corresponding components.

It is advantageous for the state of the oxide layer of the components which are under thermal load to be determined using specimens with a pre-calibrated surface condition by said sensors being introduced into the hot flow, being exposed to this flow for a certain time and then being removed and examined periodically. This method is relatively simple to implement.

However, it is also possible for the state of the oxide layer on at least one component that is subject to thermal load to be monitored on-line. The on-line monitoring is exemplarily based on an emission measurement with on-line reference or on an analysis of reflection spectra.

Furthermore, it is advantageous if the information obtained from the monitoring of the state of the oxide layer is combined with information obtained from the measurement results of a lambda sensor (oxygen sensor). It is then possible to implement a system operating mode which is oriented to the state of the oxide layer and is optimized with regard to power and efficiency.

It is expedient if information about the local composition of the combustion gas in the turbine is additionally taken into account. Information of this type can be obtained, for example, with the aid of spectral emission analysis.

Finally, methods according to the invention can also advantageously be used in cycle systems in which the working medium is liquefied through dissipation of heat and a pump is used instead of the compressor, or in systems in which an integrated membrane reactor replaces the combustion chamber.

BRIEF DESCRIPTION OF THE DRAWINGS

Four exemplary embodiments of the invention are illustrated in the drawing, in which.

In the figures, identical parts are in each case provided with identical reference symbols. The direction of flow of the media is indicated by arrows.

DETAILED DESCRIPTION OF EXEMPLARY EMBODIMENTS

The invention is explained in more detail below on the basis of exemplary embodiments and FIGS. 1 to 4.

Figure 1:
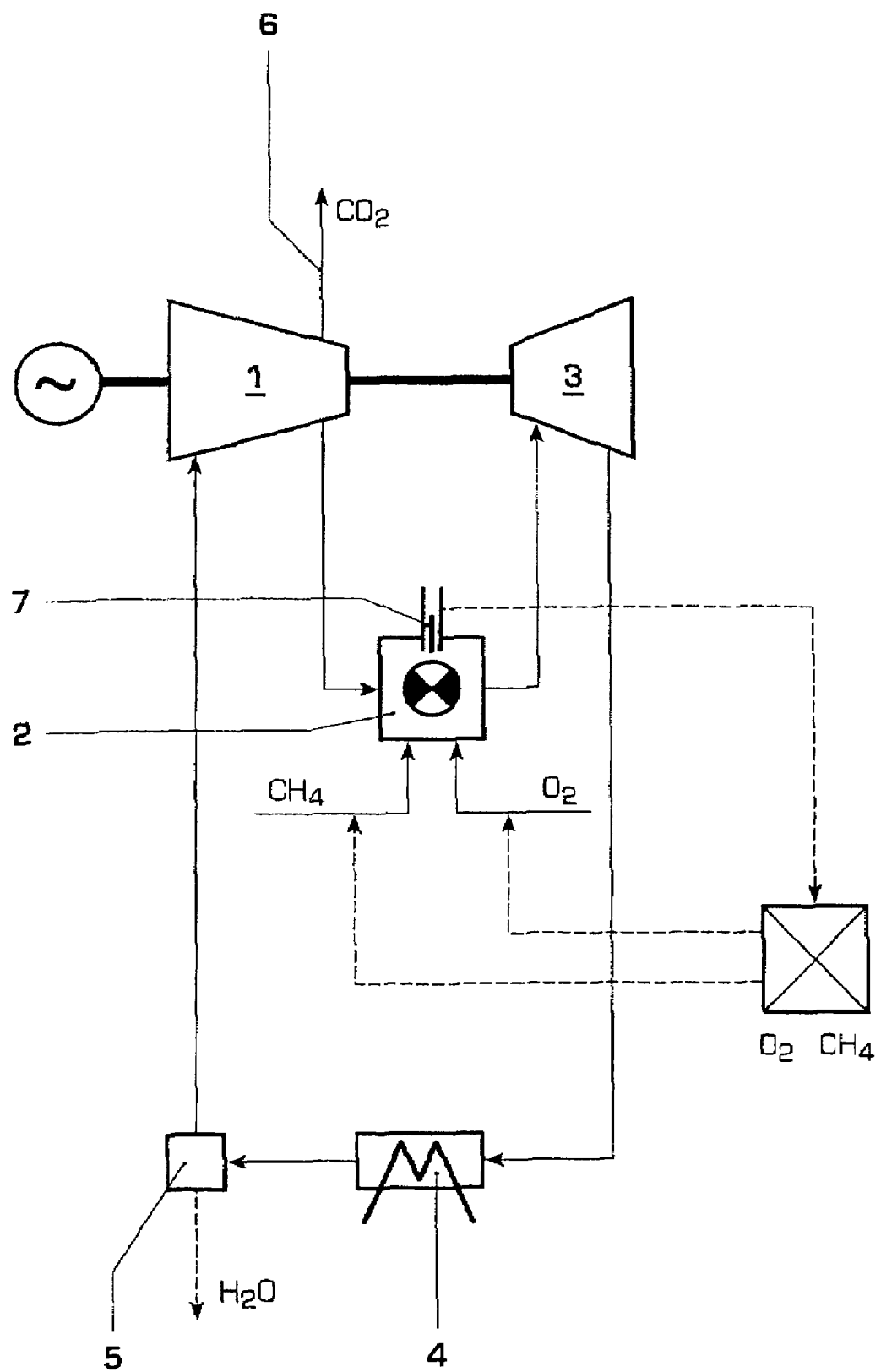
FIG. 1 shows a circuit diagram of a gas turbine system operating in accordance with the method of the invention in a first variant embodiment.

FIG. 1 illustrates a largely closed $CO_2$ gas turbine cycle. It substantially comprises a compressor 1, a combustion chamber 2, a turbine 3, a heat sink 4, a water separator 5 and a $CO_2$ removal location 6. The cycle involves internal combustion of a hydrocarbon, for example a natural gas, which predominantly comprises methane $CH_4$, in an atmosphere prepared from $O_2$, $CO_2$ and if appropriate $H_2O$. The components $CO_2$ and $H_2O$ formed as a result of the combustion, as well as any inert gases supplied with the oxygen or natural gas, are removed on an ongoing basis, so that a cycle with a substantially constant composition of the working medium is maintained.

Unlike in conventional gas turbines, in which the exhaust gases still contain a high level of oxygen, the working medium in a cycle process of this type, which predominantly comprises $CO_2$ and $H_2O$, may have reducing properties. This can cause the protective oxide layer on the metal surfaces to be worn away at the high temperatures which prevail in the combustion chamber and the turbine. To counteract this phenomenon, according to the invention the combustion is now operated with a suitable excess of oxygen. The excess of oxygen is monitored, for example, by a lambda sensor arranged in the exhaust-gas stream of the turbine.

Since the relationships between the excess of oxygen and the build-up and degradation of the oxide layer may be highly complex, it is advantageous if information about the state of the oxide layer on the components which are at risk of being damaged by high temperatures is additionally used to set the level of the oxygen excess. In accordance with FIG. 1, this is achieved by a specimen 7 having a pre-calibrated surface condition being arranged at at least one exposed location in the combustion chamber 2, being removed periodically and its surface state examined. This specimen 7 characterizes the state of the component which is subject to thermal load and is used as a basis for setting the level of the oxygen excess.

Figure 2:
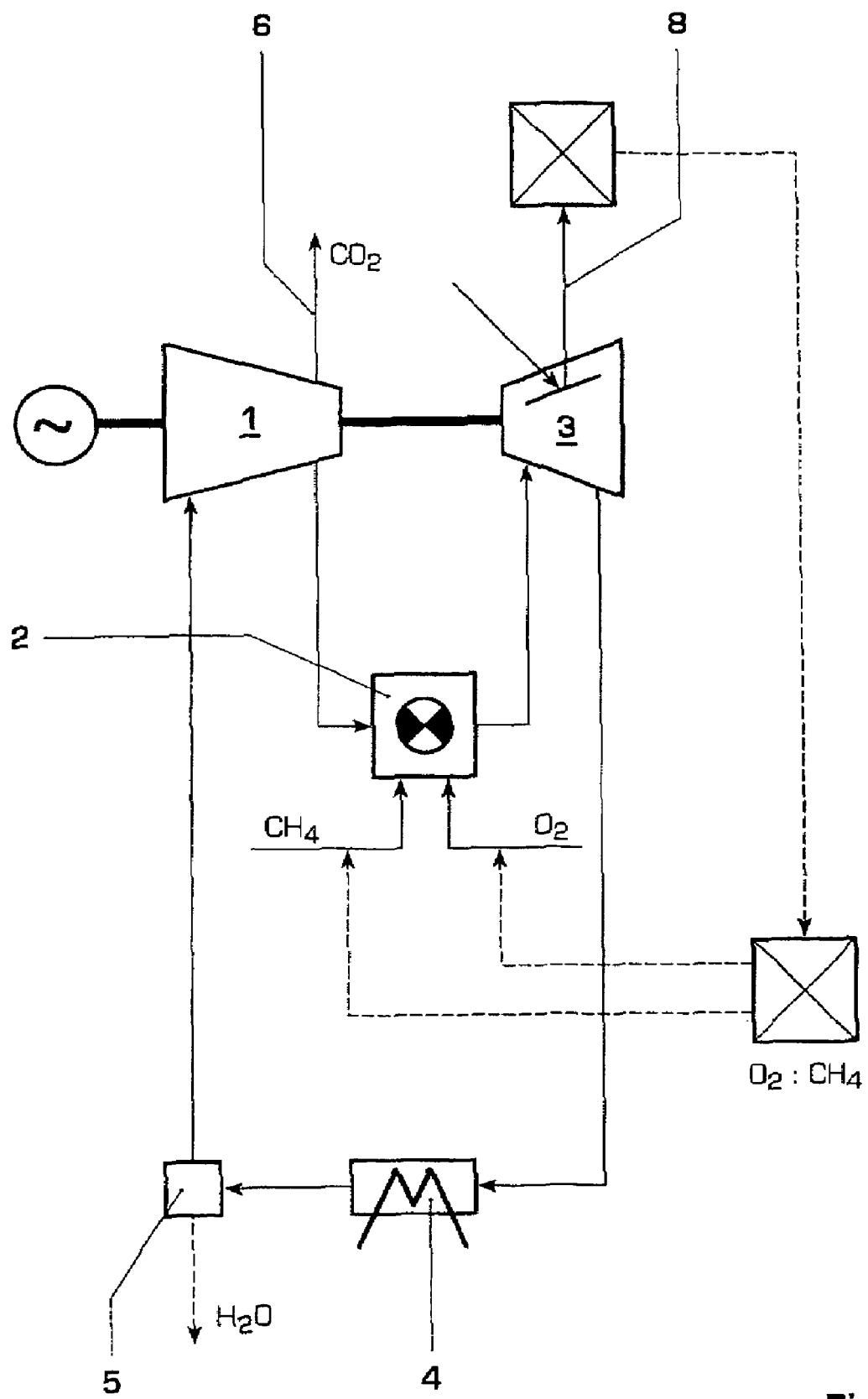
FIG. 2 shows a circuit diagram of a gas turbine system operating in accordance with the method of the invention in a second variant embodiment.

FIG. 2 shows a further exemplary embodiment of the invention. Unlike in the first exemplary embodiment, illustrated in FIG. 1, this embodiment does not use specimens 7 which have been calibrated in terms of their surface state, but rather in this case the state of the oxide layer on the components that are subject to high thermal loads, for example the guide vane of the turbine 3, is determined continuously by using an optical measurement method 8 which is known per se and is based on analysis of reflection spectra for on-line measurement of the surface state. Then, the level of oxygen excess required is determined and set on the basis of these measurements. In a further exemplary embodiment, the on-line monitoring may be based, for example, on an emission measurement with on-line reference.

The on-line oxide layer monitoring is based on using a suitably constructed optical (reflection) sensor to determine whether there is an oxide layer on a metal surface.

Oxidized and unoxidized surfaces differ in two main respects:

1. The emissivity from an oxidized surface is very high, for example for a typical Ni-base superalloy in the near IR it is >0.8. For an unoxidized surface of the same material, the emissivity under the same conditions is significantly lower (<0.5). The result of this is that at a given temperature without active illumination, the oxidized surface emits significantly more radiation than the unoxidized surface. In the event of illumination with an external source, the oxidized layer reflects less than the unoxidized surface.

2. The spectral emission characteristics, i.e. the radiated (or reflected) signal as a function of the wavelength, changes in the oxidized state compared to the unoxidized state.

If the radiation characteristic in the relevant temperature range does not change significantly, by way of example a purely passive sensor can determine the surface condition from the relative ratio of the emitted IR radiation at two or more suitable wavelengths. The relative measurement has the advantage of being insensitive to losses in the optical path (e.g. dust on viewing window), provided that these losses manifest themselves equally at both wavelengths.

Methods with active, broad-band illumination are more robust. In this case, the surface is irradiated over a broad band, for example with the light from a halogen lamp, and the reflected light is analyzed spectrally. By comparison with the illumination signal, it is possible to determine the reflectivity for each wavelength, and the formation of a quotient at different wavelengths provides information about the surface condition.

An example which may be mentioned is the alloy Hastelloy X, for which a quotient from two optical bandpasses, around 1.6 μm ($\lambda_1$) and around 2.1 μm ($\lambda_2$), is recommended for the analysis. In the case of an unoxidized surface, the reflection is greater at $\lambda_2$ than at $\lambda_1$, whereas precisely the reverse is true if an oxide layer is present. Light of both wavelengths can be flexibly transmitted via optical waveguides. To determine the bandpasses and illumination strategy, the optical properties of the combustion chamber material must be known or have been determined beforehand.

It is advantageous if the information obtained from the monitoring of the state of the oxide layer is combined with information obtained from the measurement results of a λ sensor in order to set a system operating mode which is oriented to the state of the oxide layer and is optimized with regard to power and efficiency. Furthermore, by way of example, information about the local composition of the combustion gas in the turbine can be taken into consideration, it being possible for this information to be obtained, for example, with the aid of emission analysis.

Figure 3:
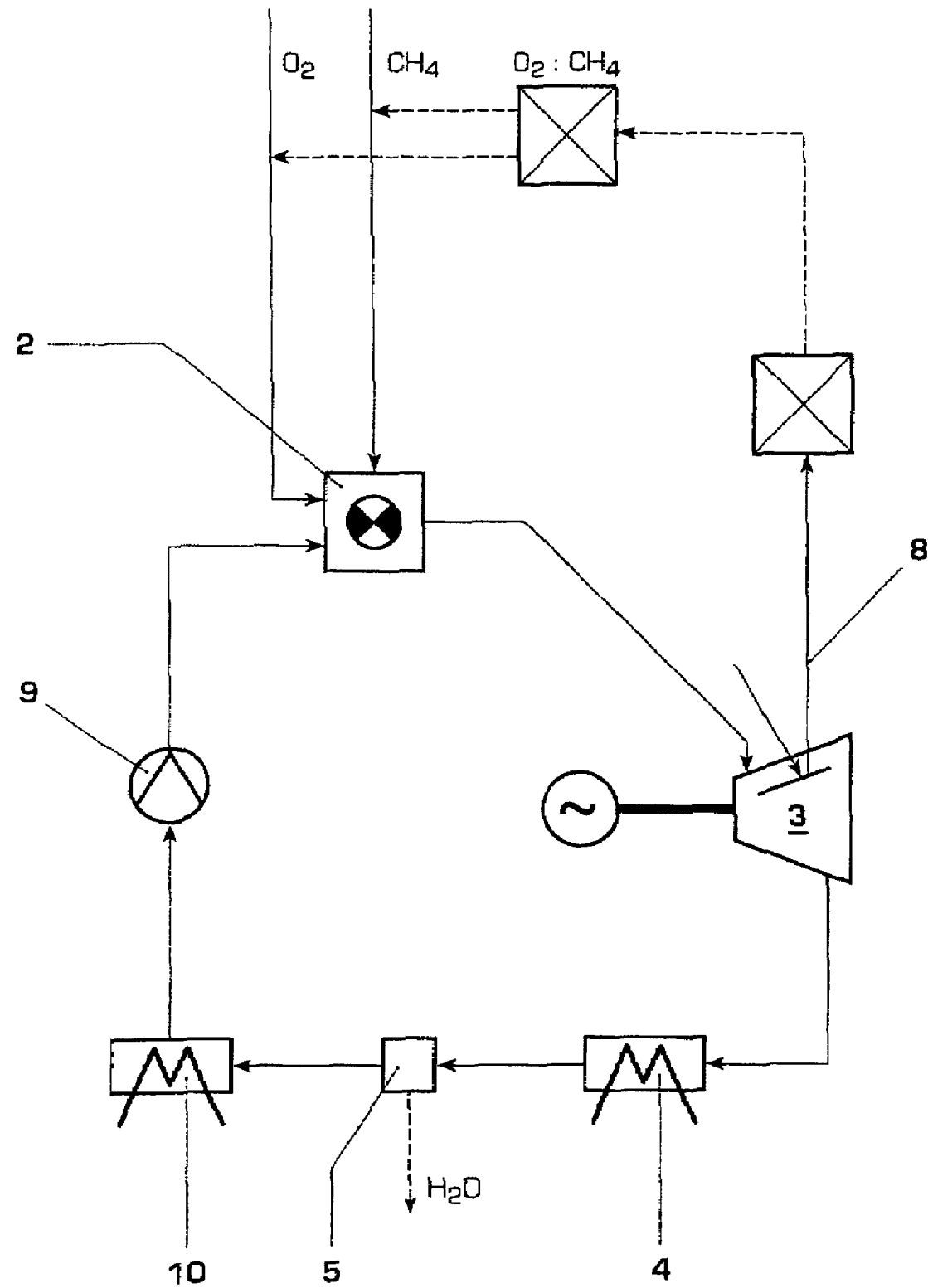
FIG. 3 shows a circuit diagram of a system operating in accordance with the method of the invention in a third variant embodiment.

A further exemplary embodiment is illustrated in FIG. 3. Unlike in the exemplary embodiment illustrated in FIG. 1, the working medium is liquefied through dissipation of heat in a $CO_2$ liquefier 10, and a pump 9, which transfers the liquid working medium to the combustion chamber 2, is used instead of the compressor.

In this example, stepped compression and expansion processes with intervening supply or dissipation of heat can be provided in order to limit the maximum operating pressure.

Figure 4:
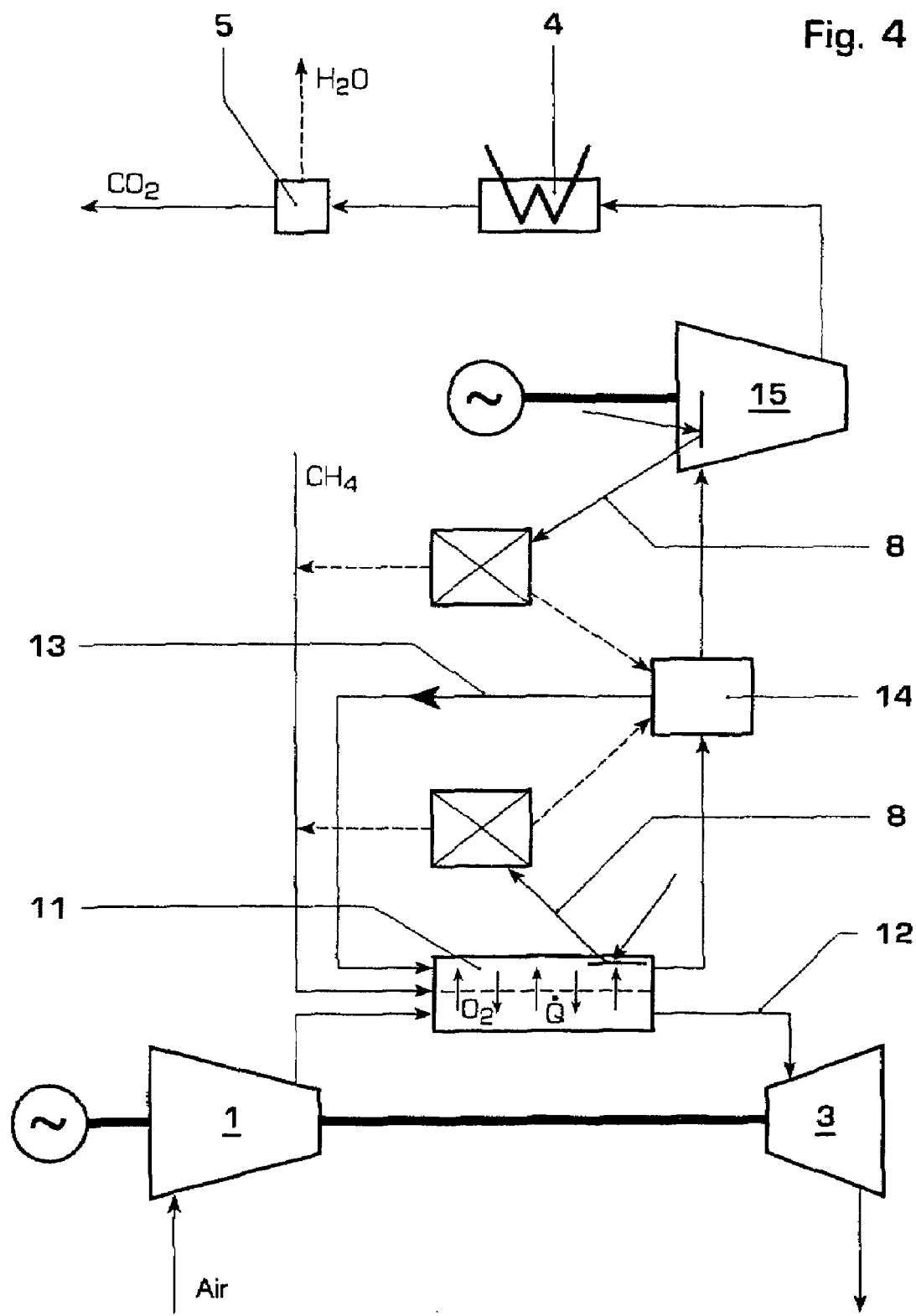
FIG. 4 shows a circuit diagram of a gas turbine system operating in accordance with the method of the invention with an integrated membrane reactor.

A final exemplary embodiment is illustrated in FIG. 4. In this case, $CH_4$ is reacted with $O_2$ in a membrane reactor 11 supplied with compressed air by a compressor 1, one side of the membrane being purged with a sweep gas 13 which comprises the hot $CO_2/H_2O$ mixture described above with a low $O_2$ content. The membrane reactor 11 is thereby integrated in the sweep cycle of the gas turbine system, which also includes a flow-splitting control valve 14. The control valve 14 is used to control what proportion of the sweep gas 13 is fed to the downstream sweep turbine 15 and what proportion remains in the sweep cycle. The hot air with a reduced oxygen content 12 which emerges from the membrane reactor 11 is expanded in the turbine 3.

In particular the membrane reactor 11, the sweep turbine 15 and any additional heat exchangers (not shown) in this example have to be protected against corrosion, and consequently on-line measurements 8 of the surface state of the thermally loaded component are carried out at these locations.

Of course, the invention is not restricted to the exemplary embodiments described. By way of example, the measurements can be carried out at a plurality of locations, or both continuous on-line measurements and periodic measurements on calibrated specimens 7 can be performed.

List of Designations

1 Compressor
2 Combustion chamber
3 Turbine
4 Heat sink, for example cooler or heat recovery utilization
5 Water separator
6 $CO_2$ removal location
7 Specimen
8 On-line measurement
9 Pump
10 $CO_2$ liquefier
11 Membrane reactor
12 Hot air with reduced $O_2$ content
13 Sweep gas 14 Flow-splitting control valve
15 Sweep turbine While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method for influencing and monitoring the oxide layer on metallic components of hot $CO_2/H_2O$ cycle systems, comprising:
    burning a hydrocarbon-containing fuel with oxygen, and forming excess $CO_2$ and $H_2O$;
    removing the excess $CO_2$ and $H_2O$ from the cycle system; and
    continuously determining the condition of said oxide layer while said components are under thermal load;
    wherein, to protect the oxide layer of the components under thermal load, burning comprises burning with an excess of oxygen, including adjusting the level of oxygen dependent at least in part on said determining the condition of the oxide layer.

2. The method as claimed in claim 1, wherein determining the condition of the oxide layer comprises determining on the basis of specimens with a pre-calibrated surface condition, introducing said specimens into a hot flow, exposing said specimens to said hot flow for a predetermined time, and periodically removing and examining said specimens.

3. The method as claimed in claim 1, wherein determining comprises monitoring on-line the condition of the oxide layer on at least one component that is subject to thermal load.

4. The method as claimed in claim 2, wherein determining further comprises monitoring on-line the condition of the oxide layer on at least one component that is subject to thermal load.

5. The method as claimed in claim 3, wherein on-line monitoring comprises emission measuring with on-line reference.

6. The method as claimed in claim 3, wherein on-line monitoring comprises analyzing reflection spectra.

7. The method as claimed in claim 1, further comprising:
    measuring combustion products formed by said burning with an oxygen sensor;
    combining information obtained from monitoring of the condition of the oxide layer with information obtained from said measuring with an oxygen sensor, and setting a system operating mode based at least in part on said combining.

8. The method as claimed in claim 7, wherein combining further comprises combining with information about the local composition of the combustion gas in a turbine.

9. The method as claimed in claim 8, comprising:
    obtaining said information about the local composition of the combustion gas in the turbine with the aid of spectral emission analysis.

10. The method as claimed in claim 1, wherein the $CO_2/H_2O$ cycle system includes at least one compressor, at least one combustion chamber, at least one gas turbine, at least one heat sink, at least one water separator, and a $CO_2$ removal location; and
    wherein burning comprising burning the carbon-containing fuel in the combustion chamber.

11. The method as claimed in claim 1, wherein the $CO_2/H_2O$ cycle system includes at least one combustion chamber, at least one gas turbine, at least one heat sink, and at least one water separator, wherein burning comprises burning the carbon-containing fuel in the combustion chamber; and comprising:
    liquefying a working medium though dissipation of heat in a $CO_2$ liquefier, and passing the liquefied working medium to the combustion chamber by a pump.

12. The method as claimed in claim 1, wherein the $CO_2/H_2O$ cycle system includes at least one compressor, at least one membrane reactor, at least one gas turbine, at least one heat sink, and at least one water separator, and comprising:
    reacting the carbon-containing fuel with the oxygen in the membrane reactor;
    supplying the membrane reactor with compressed air by the compressor;
    using the $CO_2/H_2O$ mixture as sweep gas in a sweep cycle of the gas turbine system with integrated membrane reactor; and
    feeding the $CO_2/H_2O$ mixture to a sweep turbine.

13. A method as claimed in claim 1, wherein the hot $CO_2/H_2O$ cycle system comprises a $CO_2/H_2O$ gas turbine system.

14. The method as claimed in claim 4, wherein the on-line monitoring is based on an emission measurement with on-line reference.

15. The method as claimed in claim 4, wherein the on-line monitoring is based on an analysis of reflection spectra.

* * * * *